United States Patent
Chakrabarti et al.

(10) Patent No.: US 8,856,047 B2
(45) Date of Patent: Oct. 7, 2014

(54) FAST PERSONALIZED PAGE RANK ON MAP REDUCE

(75) Inventors: Kaushik Chakrabarti, Redmond, WA (US); Dong Xin, Redmond, WA (US); Bahman Bahmani, Stanford, CA (US)

(73) Assignee: Microsoft Corporation, Redmond, WA (US)

(*) Notice: Subject to any disclaimer, the term of this patent is extended or adjusted under 35 U.S.C. 154(b) by 442 days.

(21) Appl. No.: 13/164,788

(22) Filed: Jun. 21, 2011

(65) Prior Publication Data

US 2012/0330864 A1    Dec. 27, 2012

(51) Int. Cl.
G06F 17/10    (2006.01)
G06F 17/16    (2006.01)
G06F 17/17    (2006.01)
G06F 17/30    (2006.01)

(52) U.S. Cl.
CPC .............................. *G06F 17/30864* (2013.01)
USPC ............. 706/10; 707/706; 707/713; 707/721; 707/723

(58) Field of Classification Search
USPC .......................................................... 706/10
See application file for complete search history.

(56) References Cited

U.S. PATENT DOCUMENTS

| | | |
|---|---|---|
| 7,464,075 B2 | 12/2008 | McSherry et al. |
| 7,512,587 B2 | 3/2009 | McSherry |
| 7,523,123 B2 | 4/2009 | Yang et al. |
| 7,739,314 B2 | 6/2010 | Datar et al. |
| 2010/0281022 A1 | 11/2010 | Gollapudi et al. |

OTHER PUBLICATIONS

Fogaras et al. (Fogaras), "Towards Scaling Fully Personalized PageRank", 2004.*
Baykan et al., A Comparison of Techniques for Sampling Web Pages [online], 2009 [retrieved on Jul. 13, 2013]. Retrieved from the Internet<URL:http://arxiv.org/pdf/0902.1604v1>.*
Rapaport, Algorithms for Lattice Statistics [online], 1987 [retrieved on Nov. 2, 2013]. Retrieved from the Internet<URL:http://www.google.com/url?sa=t&rct=j&q=RAPAPORT+%E2%80%9CALGORITHMS+FOR+LATTICE+STATISTICS%E2%80%9D%2C+1987&source=web&cd=1&ved=0CDEQFjAA&url=http%3A%2F%2Fwww.ph.biu.ac.il%2F~rapaport%2Fpapers%2F87a-cpr.pdf&ei=gCOMUtP6D6GCyQGTy4>.*
Tsourakakis, Data Mining with MAPREDUCE: Graph and Tensor Algorithms with Applications [online], 2010 [retrieved on Aug. 2, 2013].Retrieved from the Internet:<URL:http://www.google.com/url?sa=t&rct=j&q=personalized%20pagerank%20ON%20(%22mapreduce%22%20OR%20%22mapreduce%22)&source=web&cd=55&ved=CEIQFjAEODI&url=http%3A%2F%2Fwww.math.cmu.edu%2F>.*

(Continued)

*Primary Examiner* — Jeffrey A Gaffin
*Assistant Examiner* — Nathan Brown, Jr.
(74) *Attorney, Agent, or Firm* — Dan Choi; Sandy Swain; Micky Minhas (57) ABSTRACT

A personalized page rank computation system is described herein that provides a fast MapReduce method for Monte Carlo approximation of personalized PageRank vectors of all the nodes in a graph. The method presented is both faster and less computationally intensive than existing methods, allowing a broader scope of problems to be solved by existing computing hardware. The system adopts the Monte Carlo approach and provides a method to compute single random walks of a given length for all nodes in a graph that it is superior in terms of the number of map-reduce iterations among a broad class of methods. The resulting solution reduces the I/O cost and outperforms the state-of-the-art FPPR approximation methods, in terms of efficiency and approximation error. Thus, the system can very efficiently perform single random walks of a given length starting at each node in the graph and can very efficiently approximate all the personalized PageRank vectors.

20 Claims, 4 Drawing Sheets

(56) References Cited

OTHER PUBLICATIONS

Nemirovsky, Danil, "Monte Carlo Methods and Markov Chain Based Approaches for Pagerank Computation", Retrieved at <<http://www-sop.inria.fr/teams/maestro/THESIS/Nemirovsky-thesis.pdf>>, Jul. 2, 2010, pp. 212.

Rao, et al., "Ranking and Semi-supervised Classification on Large Scale", Retrieved at <<http://www.aclweb.org/anthology/W/W09/W09-3209.pdf>>, Workshop on Graph-based Methods for Natural Language Processing, Aug. 7, 2009, pp. 58-65.

Gleich, et al., "Approximating Personalized PageRank with Mininal Use of Web Graph Data", Retrieved at <<http://citeseerx.ist.psu.edu/viewdoc/download?doi=10.1.1.85.9446&rep=rep1&type=pdf>>, vol. 3 No. 32006, pp. 1-28, 2006.

"Hadoop", Retrieved at <<http://hadoop.apache.org/>>, Retrieved Date: Dec. 20, 2010, pp. 3.

"Pig", Retrieved at <<http://pig.apache.org/>>, Retrieved Date: Dec. 20, 2010, pp. 2.

Avrachenkov, et al., "Monte Carlo Methods in PageRank Computation:When One Iteration is Sufficient", Retrieved at <<http://wwwhome.math.utwente.nl/~litvakn/mc.pdf>>, SIAM Journal on Numerical Analysis, vol. 45 No. 2, 2007, pp. 1-20.

Bahmani, et al., "Fast Incremental and Personalized PageRank", Retrieved at <<http://arxiv.org/abs/1006.2880>>, Proceedings of the VLDB Endowment, vol. 4 No. 3, 2010, pp. 2.

Berkhin, Pavel, "A Survey on Pagemark Computing", Retrieved at <<http:citeseerx.ist.psu.edu/viewdoc/download?doi=10.1.1.102.2294&rep=rep1&type=pdf>>, Internet Mathematics, vol. 2 No. 1, Jul. 13, 2005, pp. 73-120.

Berkhin, Pavel, "Bookmark-coloring algorithm for personalized pagerank computing", Retrieved at <<http://citeseerx.ist.psu.edu/viewdoc/download?doi=10.1.1.116.7466&rep=rep1&type=pdf>>, Internet Mathematics, vol. 3 No. 1, 2006, pp. 41-62.

Chaiken, et al., "Scope: Easy and Efficient Parallel Processing of Massive Data Sets", Retrieved at <<http://www.goland.org/Scope-VLDB-final.pdf>>, The VLDB Endowment, vol. 1, No. 2, Aug. 24-30, 2008, pp. 12.

Cohen, Jonathan, "Graph Twiddling in a Mapreduce World", Retrieved at <<http://behemoth.strlen.net/~alex/graph_twiddling.pdf>>, Computing in Science and Engineering, vol. 11 No. 4, Jul.-Aug. 2009, pp. 29-41.

Craswell, et al., "Random Walks on the Click Graph", Retrieved at <<http://citeseerx.ist.psu.edu/viewdoc/download?doi=10.1.1.94.6108&rep=rep1&type=pdf>>, Proceedings of the 30th annual international ACM SIGIR conference on Research and development in information retrieval, Jul. 23-27, 2007, pp. 8.

Sarma, et al., "Estimating PageRank on Graph Streams", Retrieved at <<http://research.microsoft.com/pubs/65175/pagerankpods.pdf>>, Proceedings of the Twenty-Seventh ACM SIGMOD-SIGACT-SIGART Symposium on Principles of Database Systems, 2008, pp. 10.

Dean, et al., "Mapreduce: Simplified Data Processing on Large Clusters", Retrieved at <<http://portal.acm.org/citation.cfm?id=1327452.1327492&coll=GUDIE&dl=&idx=J79&part=magazine&WantType=Magazines&title=Communications%20of%20the%20ACM>>, Magazine: Communications of the ACM—50th anniversary, 2008, vol. 51 No. 1, pp. 1-13.

Fogaras, et al., "Towards Scaling Fully Personalized PageRank", Retrieved at <<http://www.springerlink.com/index/NR8Y6A19796UEDEF.pdf>>,In Proceedings of the 3rd Workshop on Algorithms and Models for the Web-Graph, 2004, pp. 12.

Ghemawat, et al., "The Google File System", Retrieved at <<http://portal.acm.org/citation.cfm?id=1165389.945450>>, Proceedings of the nineteenth ACM symposium on Operating systems principles, vol. 37 No. 5, Oct. 19-22, 2003, pp. 29-43.

Gyongyi, et al., "Combating Web Spam with Trustrank", Retrieved at <<http://portal.acm.org/citation.cfm?id=1316689.1316740>>, Proceedings of the Thirtieth international conference on Very large data bases, vol. 30, 2004, pp. 576-587.

Haveliwala, Taher H., "Topic-sensitive Pagerank", Retrieved at <<http://citeseerx.ist.psu.edu/viewdoc/download?doi=10.1.1.62.1440&rep=rep1&type=pdf>>, Proceedings of the 11th international conference on World Wide Web, 2002, pp. 1-15.

Isard, et al., "Dryad: Distributed Data-parallel Programs from Sequential Building Blocks", Retrieved at <<http://portal.acm.org/citation.cfm?id=1273005>>, Proceedings of the 2nd ACM SIGOPS/EuroSys European Conference on Computer Systems, vol. 41 No. 3, Mar. 21-23, 2007, pp. 14.

Jeh, et al., "Scaling Personalized Web Search", Retrieved at <<http://portal.acm.org/citation.cfm?id=775152.775191&type=series>>, Proceedings of the 12th international conference on World Wide Web, May 20-24, 2003, pp. 1-24.

Kang, et al., "Hadi: Fast Diameter Estimation and Mining in Massive Graphs with Hadoop", Retrieved at <<http://citeseerx.ist.psu.edu/viewdoc/download?doi=10.1.1.152.3568&rep=rep1&type=pdf>>, CMU Machine Learning Tech Report, vol. 8, Dec. 2008, pp. 26.

Kang, et al., "Pegasus: A Peta-Scale Graph Mining System—Implementation and Observations", Retrieved at <<http://ieeexplore.ieee.org/stamp/stamp.jsp?tp=&arnumber=5360248>>, Proceedings of the Ninth IEEE International Conference on Data Mining, Dec. 6-9, 2009, pp. 229-238.

Langville, et al., "Deeper Inside PageRank", Retrieved at <<http://citeseerx.ist.psu.edu/viewdoc/download?doi=10.1.1.141.6561&rep=rep1&type=pdf>>, Internet Mathematics, vol. 1 No. 3, Oct. 20, 2004, pp. 1-33.

Liben-Nowell, "The link prediction problem for social networks", Retrieved at <<http://citeseerx.ist.psu.edu/viewdoc/download?doi=10.1.1.163.6528&rep=rep1&type=pdf>>, Proceedings of the twelfth international conference on Information and knowledge management, Journal of the American Society for Information Science and Technology, vol. 58 No. 7, Nov. 2003, pp. 1-23.

Lin, et al., "Data-Intensive Text Processing with MapReduce", Retrieved at <<http://www.umiacs.umd.edu/~jimmylin/MapReduce-book-final.pdf>>, 2010, pp. 175.

Lin, et al., "Design Patterns for Efficient Graph Algorithms in MapReduce", Retrieved at <<http://www.umiacs.umd.edu/~jimmylin/publications/Lin_Schatz_MLG2010.pdf>>, Proceedings of the Eighth Workshop on Mining and Learning with Graphs, pp. 78-85.

McSherry, Frank, et al., "A Uniform Approach to Accelerated Page Rank Computation", Retrieved at <<http://www2005.org/cdrom/docs/p575.pdf>>, Proceedings of the 14th international conference on World Wide WebMay 10-14, 2005, pp. 575-582.

Ng, et al., "Stable Algorithms for Link Analysis", Retrieved at <<http://ai.stanford.edu/~ang/papers/sigir01-stablelinkanalysis.pdf>>, Proceedings of the 24th annual international ACM SIGIR conference on Research and development in information retrieval, Sep. 9-12, 2001, pp. 9.

Olston, et al., "Pig Latin: A Not-So-Foreign Language for Data Processing", Retrieved at <<http://pages.cs.brandeis.edu/~cs147a/papers/pig-latin-sigmod08.pdf>>, ACM SIGMOD International Conference on Management of Data (Industrial Track), Jun. 9-12, 2008, pp. 1-12.

"The PageRank Citation Ranking: Bringing Order to the Web", Retrieved at <<http://www.cs.umd.edu/areas/db/dbchat/papers/pageranksub.pdf>>, Jan. 29, 1998, pp. 1-17.

Rafiei, et al., "What is this Page Known for? Computing Web Page Reputations", Retrieved at <<http://citeseerx.ist.psu.edu/viewdoc/download?doi=10.1.1.43.3278&rep=rep1&type=pdf>>, Proceedings of the 9th international World Wide Web conference on Computer networks: the international journal of computer and telecommunications networking, vol. 33 No. 1-6, 2002, pp. 1-17.

Sarlos, et al., "To Randomize or Not to Randomize: Space Optimal Summaries for Hyperlink Analysis", Retrieved at <<http://www2006.org/programme/files/xhtml/3041/fp3041-sarlos/fp3041-sarlos.html>>, Proceedings of the 15th international conference on World Wide Web, May 23-26, 2006, pp. 22.

Yang, et al., "Map-Reduce-Merge: Simplified Relational Data Processing on Large Clusters", Retrieved at <<http://www.cs.brown.edu/courses/csci2950-t/mapreducemerge.pdf>>, Proceedings of the (56) References Cited

OTHER PUBLICATIONS

ACM SIGMOD international conference on Management of data, Jun. 12-14, 2007, pp. 1029-1040.
Yu, et al., "Dryadlinq: A System for General-Purpose Distributed Data-Parallel Computing Using a High-Level Language", Retrieved at <<http://research.microsoft.com/en-us/projects/DryadLINQ/ DryadLINQ.pdf>>, Symposium on Operating System Design and Implementation, Dec. 2008, pp. 1-14.
Bahmani et al., "Fast Personalized PageRank on MapReduce," In Proceedings of the 2011 ACM SIGMOD International Conference on Management of data, Jun. 12-16, 2011, 12 pages. Available at: http://research.microsoft.com/pubs/145447/mod113-bahmani.pdf.

* cited by examiner

FAST PERSONALIZED PAGE RANK ON MAP REDUCE

BACKGROUND

Very large-scale datasets and graphs are ubiquitous in today's world: World Wide Web, online social networks, huge search logs and query-click logs regularly collected and processed by search engines, and so forth. Because of the massive scale of these datasets, doing analyses and computations on them is infeasible for individual machines. Therefore, there is a growing need for distributed ways of storing and processing these datasets. MapReduce, a simple model of computation, has recently emerged as a very attractive way of doing such analyses. Its effectiveness and simplicity has resulted in its implementation by different Internet companies, and widespread adoption for a wide range of applications, including large-scale graph computations.

One of the most well known graph computation problems is computing personalized page ranks (PPR). Personalized page ranks (and other personalized random walk based measures) have proved to be very effective in a variety of applications, such as link prediction and friend recommendation in social networks, and there are many algorithms designed to approximate them in different computational models, including random access, external memory, and distributed models. Here, and throughout this specification, we assume to have a weighted directed graph $G=(V,E)$ with n nodes and m edges. We denote the weight on an edge $(u,v) \in E$ with $\alpha_{u,v}$ and, for the sake of simplifying the presentation of some of the formulae, assume that the weights on the outgoing edges of each node sum up to one.

Page rank is the stationary distribution of a random walk that at each step, with a probability $\epsilon$, usually called the teleport probability, jumps to a random node and with probability $1-\epsilon$ follows a random outgoing edge from the current node. Personalized page rank is the same as page rank, except all the random jumps are done back to the same node, denoted as the "source" or "seed" node, for which we are personalizing the page rank. The personalized page rank of node v, with respect to a source node u, denoted by $\pi_u(v)$, satisfies:

$$\pi_u(v) = \epsilon \delta_u(v) + (1-\epsilon) \Sigma_{\{w|(w,v) \in E\}} \pi_u(w) \alpha_{w,v} \quad (1)$$

Where $\delta_u(v)=1$ if and only if $u=v$ (and zero otherwise). The fully personalized page rank computation problem is to compute all the vectors $\vec{\pi}_u$ for all $u \in V$. Most applications, such as friend recommendation or query suggestion, only require the top k values (and corresponding nodes) in each PPR vector (for some suitable value of k).

There are two broad approaches to computing personalized page rank. The first approach is to use linear algebraic techniques, such as Power Iteration. The other approach is Monte Carlo, where the basic idea is to approximate personalized page ranks by directly simulating the corresponding random walks and then estimating the stationary distributions with the empirical distributions of the performed walks. Monte Carlo methods generally depend on generating a large number of inputs that are truly random. Based on this idea, it has previously been proposed to start at each node $u \in V$, do a number, R, of random walks starting at u, called "fingerprints", each having a length geometrically distributed as $Geom(\epsilon)$. Each fingerprint simulates a continuous session by a random surfer who is doing the PPR random walk. Then, the frequencies of visits to different nodes in these fingerprints will approximate the personalized page ranks.

MapReduce is a simple computation model for processing huge amounts of data in massively parallel fashion, using a large number of commodity machines. By automatically handling the lower level issues, such as job distribution, data storage and flow, and fault tolerance, it provides a simple computational abstraction. In MapReduce, computations are done in three phases. The Map phase reads a collection of values or key/value pairs from an input source, and by invoking a user defined Mapper function on each input element independently and in parallel, emits zero or more key/value pairs associated with that input element. The Shuffle phase groups together all the Mapper-emitted key/value pairs sharing the same key, and outputs each distinct group to the next phase. The Reduce phase invokes a user-defined Reducer function on each distinct group, independently and in parallel, and emits zero or more values to associate with the group's key. The emitted key/value pairs can then be written on the disk or be the input of a Map phase in a following iteration.

Unfortunately, existing Monte Carlo methods for determining random walks for personalized page ranks are slow and computationally intensive in terms of processing and input/output (I/O) resources. This limits the breadth and scope of problems that can be solved using these methods.

SUMMARY

A personalized page rank computation system is described herein that provides a fast MapReduce method for Monte Carlo approximation of personalized page rank vectors of all the nodes in a graph. The method presented is both faster and less computationally intensive than existing methods, allowing a broader scope of problems to be solved by existing computing hardware. The system adopts the Monte Carlo approach, which involves simulating a number of random walks (fingerprints) from each node. The Monte Carlo approach for FPPR approximation naturally has a high parallelization property, as any fingerprint starting at any source node can be computed in parallel with and independently from all other fingerprints. The personalized page rank computation system provides a method to compute single random walks of a given length for all nodes in a graph that it is superior in terms of the number of map-reduce iterations among a broad class of methods. Based on that, the system provides an efficient method to approximate fully personalized page ranks in MapReduce. The resulting solution reduces the I/O cost and, on real graph data and on a production MapReduce environment, outperforms the state-of-the-art FPPR approximation methods, in terms of efficiency and approximation error. Thus, the personalized page rank computation system can very efficiently perform single random walks of a given length starting at each node in the graph and can very efficiently approximate all the personalized page rank vectors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A personalized page rank computation system is described herein that provides a fast MapReduce method for Monte Carlo approximation of personalized page rank vectors of all the nodes in a graph. The method presented is both faster and less computationally intensive than existing methods, allowing a broader scope of problems to be solved by existing computing hardware. The system adopts the Monte Carlo approach, which involves simulating a number, R, of random walks (fingerprints) from each node. Therefore, the system first solves a sub-problem called the Single Random Walk problem (SRW-MapReduce). The solution of this problem produces a MapReduce method that given a graph G and a length λ, outputs one random walk of length λ starting from each node in the graph.

To fully leverage the power of parallel computation supported by MapReduce, a good solution has the following properties: (1) high parallelization and (2) small number of map-reduce iterations. The Monte Carlo approach for FPPR approximation naturally has the high parallelization property, as any fingerprint starting at any source node can be computed in parallel with and independently from all other fingerprints (for the same or different source nodes). However, some of the fingerprints may be very long, and hence require a large number of map-reduce iterations using the straightforward implementation (e.g., one map-reduce iteration for each step in the walk). For instance, with $\epsilon=0.2$, a fingerprint can be longer than 10 steps with probability 0.11, and be longer than 20 steps with probability 0.012. These long walks will become the bottleneck of the method, blocking the entire computation, and causing it to take too long to run.

The personalized page rank computation system provides a method to compute single random walks of a given length for all nodes in a graph that it is superior in terms of the number of map-reduce iterations among a broad class of methods. Based on that, the system provides an efficient algorithm to approximate fully personalized page ranks in MapReduce. The resulting solution reduces the I/O cost and, on real graph data and on a production MapReduce environment, outperforms the state-of-the-art FPPR approximation methods, in terms of efficiency and approximation error. Thus, the personalized page rank computation system can very efficiently perform single random walks of a given length starting at each node in the graph and can very efficiently approximate all the personalized page rank vectors.

Reducer/Combiner Definition

The description herein will use two high level primitives that can be built on the MapReduce framework: Reducer and Combiner, where the Reducer is defined as:

⟨output⟩=Reduce⟨input⟩On ⟨key⟨Using Reducer-UDF and the Combiner is defined as:

⟨output⟩=Combine ⟨input1⟨With ⟨input2⟨ON
⟨input1. key1⟨=⟨input2. key2⟨Using Combiner-UDF A Reducer groups data from an input by its key, processes the data by a user-defined function ReducerUDF, and sends results to output. Note that here the Reducer is a high-level programming primitive, which is different from the concept of the reducer in the reduce phase of the traditional MapReduce framework. As used herein, the term Reducer refers to such high level primitive.

Given a graph data which is represented by triples G= ⟨u,v,weight⟨ (i.e., edges), the task to compute a random neighbor for each source node u can be implemented by a Reducer by using u as key, grouping all ⟨u,v,weight⟨ triples (for all v), and generating one random neighbor v for u and outputting ⟨u,v⟨ in ReducerUDF.

A Combiner is a join primitive, which joins input11 and input2 by input1.key1 and input2.key2, and processes the data by a user-defined function CombinerUDF. For example, suppose the random neighbor output in the above example is N=⟨u,v⟨. The task of further extending ⟨u,v⟨ to ⟨u,v,t⟨ by finding a random neighbor t of v can be implemented by a Combiner by joining N and G on condition N.v=G.u, and finding a random neighbor t of N.v from the graph G and outputting ⟨u,v,t⟨ in CombinerUDF.

Monte Carlo Baseline

The Monte Carlo approach simulates R random walks from each source node u. Here we outline a straightforward implementation of this method on MapReduce. The method includes three phases: an initial Reducer to initialize R random walks from u, a sequence of Combiner iterations to extend each random walk until it teleports to u, and a final Reducer to aggregate the frequencies of visits to every node v in all R walks (for each source node) and to approximate the PPR values.

The initial Reducer and the Combiner are very similar to the examples given above in the definition of a Reducer and Combiner. The Combiner will be invoked multiple times. At each iteration, every walk that has not yet finished is extended by one randomly chosen neighbor from its endpoint, and then it is decided if the walk will teleport at this step. If a walk is finished, the Combiner stores it on disk. After all walks are finished, the method calls the final Reducer for each u, and computes the visiting frequencies of all nodes v (w.r.t. the source node u). The baseline implementation needs to execute the Combiner many times for long walks. The personalized page rank computation system provides a method to implement the Monte Carlo approach using a very small number of iterations, which eliminates the need for heuristics or other reductions of accuracy. Even if one wants to cut the longer walks, it will still be more efficient to implement the resulting walks using the described method.

SQRT Method

One previously used method to generate a single random walk from a source node is as follows. To do a walk of length λ, the method first samples one short segment of length θ out of each node in a randomly sampled subset of the nodes, and then tries to merge these segments to form the longer walk. However, to keep the random walk truly random, the method cannot use the segment at each node more than once. So, if the method hits a node for the second time, it gets stuck, in which case it samples (through one more pass over the data on disk) a number s of edges out of a properly defined set of nodes, and brings them to the main memory to continue the walk. However, this method is unsuitable for MapReduce, as there is no globally shared memory available.

There are two easy ways out of this problem. First, whenever hitting a stuck node, the method can take one random outgoing edge, and extend the walk only by that edge. This removes the need for shared memory, but can reduce the performance of the method to the Monte Carlo baseline described previously (in the worst case).

Second, the method can make sure there are no stuck nodes by sampling more segments per node. More precisely, if we sample $\lambda/\theta$ segments (of length $\theta$) per node, then no node is ever going to be stuck (as the method will not use more than $\lambda/\theta$ segments in the whole walk of length $\lambda$). This is referred to herein as the SQRT method.

SQRT(G,$\lambda$,$\theta$) (assuming $\lambda/\theta$ to be integer, for simplicity of discussion), first samples $\lambda/\theta$ independent segments of length $\theta$ using edge-by-edge extension by GenSeg(G,$\lambda$,$\theta$). Each segment is labeled by an identifier i=1, . . . ,$\lambda/\theta$. Then, the method merges these segments together, based on the order of their identifiers, to make longer and longer segments and eventually end up with one random walk of length $\lambda$ starting at each node.

The SQRT method includes two parts: segment generation, that performs $\theta$ iterations to generate the initial segments, and segment merge, that performs $\lambda/\theta$ iterations to merge the segments. Hence, the method performs a total of $\theta+\lambda/\theta$ iterations, which is optimized when $\theta=\sqrt{\lambda}$, resulting in $2\sqrt{\lambda}$ iterations. SQRT improves the number of performed iterations compared to the baseline algorithm (needing $\lambda$ iterations). However, for long walks, it can still perform a large number of iterations. The following pseudocode shows example implementations of the GenSeg and SQRT functions. The next section shows that the ranking system can compute long random walks in the MapReduce framework using a very small number of iterations.

The GenSeg method is implemented as follows:

```
GenSeg(G, λ, θ)
  Input: A (weighted) graph G = (V,E), parameters λ and θ.
  Output: λ/θ independent random walk segments starting at each node,
  each of length θ, except the last one while will be shorter if λ/θ is
  not an integer.
    Initialization For each ∈ V, and 1 ≤ i ≤ λ/θ, set S[u, i] = u.
    for j = 1 to θ do
      for i = 1 to λ/θ do
        if (i = λ/θ and 0 < λ − θ(λ/θ) < j) then
          Break; //the last segment
        end if
        w = RandomNeighbor(R[u, i].LastNode);
        S[u, i] = S[u, i].Append(w);
      end for
    end for
    Return S;
```

The SQRT method is implemented as follows:

```
SQRT(G, λ, θ)
  Input: A (weighted) graph G = (V,E), the desired length of the walks
  λ, and the length of initial segments θ.
  Output: A solution to the single random walk problem, i.e., one
  random walk of length λ starting at each graph node.
    Let S = GenSeg (G,λ,θ) ;
    Define ∀u ∈ V : W[u] = u. //Initial Reducer
    for i = 1 to ⌈λ/θ⌉ do
      for each u ∈ V do
        W[u] =W[u].Append(S[W[u].LastNode, i]);
      end for
    end for
    Return W;
```

Single Random Walk

The MapReduce method used by the personalized page rank computation system for FPPR approximation is based on very efficiently doing single random walks of a given length $\lambda$, starting at each node in the graph. Notice that we do not require the random walks at different nodes to be independent, but we do require the random walk starting at each node to be a true random walk. This section introduces a new Doubling function, and shows that the function achieves an efficient number of iterations among a large family of single random walk algorithms as well as a reduced I/O cost.

Similar to the SQRT method, Doubling(G,$\lambda$,$\theta$), listed in pseudocode below starts (again, assuming $\lambda/\theta$ to be integer, for simplifying the discussion here) by generating $\lambda/\theta$ independent segments of length $\theta$, and then merges these segments to form the longer walk (of length $\lambda$). However, Doubling merges the segments in a very different way, and heavily takes advantage of the parallel computation model of MapReduce.

```
Doubling(G, λ, θ)
  Input: A (weighted) graph G = (V,E), the desired length of the walks
  λ, and the length of initial segments θ.
  Output: One random walk of length λ starting at each graph node.
    Let S = GenSeg (G, λ, θ) ;
    Define η = [λ/θ], and ∀u ∈ V,1 ≤ i ≤ η: W[u,i,η] = S[u,i],E[u,i,η] =
    S[u,i].LastNode; //Initial Reducer
    //Combiner iterations
    while η > 1 do
      η' = ⌈(η+1)/2⌉;
      for i = 1 to η'do
        for each u ∈ V do
          if i = (η+1)/2 then
            W[u, i, η'] = W[u, i, η];
            E[u, i, η'] = E[u, i, η];
            Continue;
          end if
          v = E[u, i, η];
          W[u, i, η'] = W[u, i, η].Append(W[v, η − i + 1, η]);
          E[u, i, η'] = E[v, η − i + 1, η];
        end for
      end for
      η = η';
    end while
    For each u ∈ V , output W[u, 1, 1]; //the computed random walk
```

The following example will help describe the Doubling method's merge operation. Assume $\lambda=17$, $\theta=3$. The method first generates $\eta=\lceil 17/3 \rceil=6$ segments, S[u,i] ($1\le i\le 6$) for each node u ∈ V , where S[u,6] is of length 2 while the other segments S[u,i] (i<6) are of length 3.

Unlike the SQRT method, where only one walk W[u] from u is defined at each iteration, the Doubling method maintains multiple walks W[u,i,$\eta$] at the same time, where i is the identifier of W[u,i,$\eta$], and $\eta$ is the maximum identifier at the current iteration. In the beginning, $\eta$=6, and W[u,i,$\eta$]=S[u,i] for i=1, . . . , 6. Then, the method starts merging segments. The method merges two segments W1 and W2 (i.e., appends W2 to W1) if W1.LastNode=W2.FirstNode, W1.ID<W2.ID, and W1.ID+W2.ID=$\eta$+1. After appending W2 to W1, the method keeps W1.ID unchanged. Thus, one merging iteration will reduce the maximum ID from $\eta$ to $$\frac{\eta+1}{2}.$$

Figure 4:
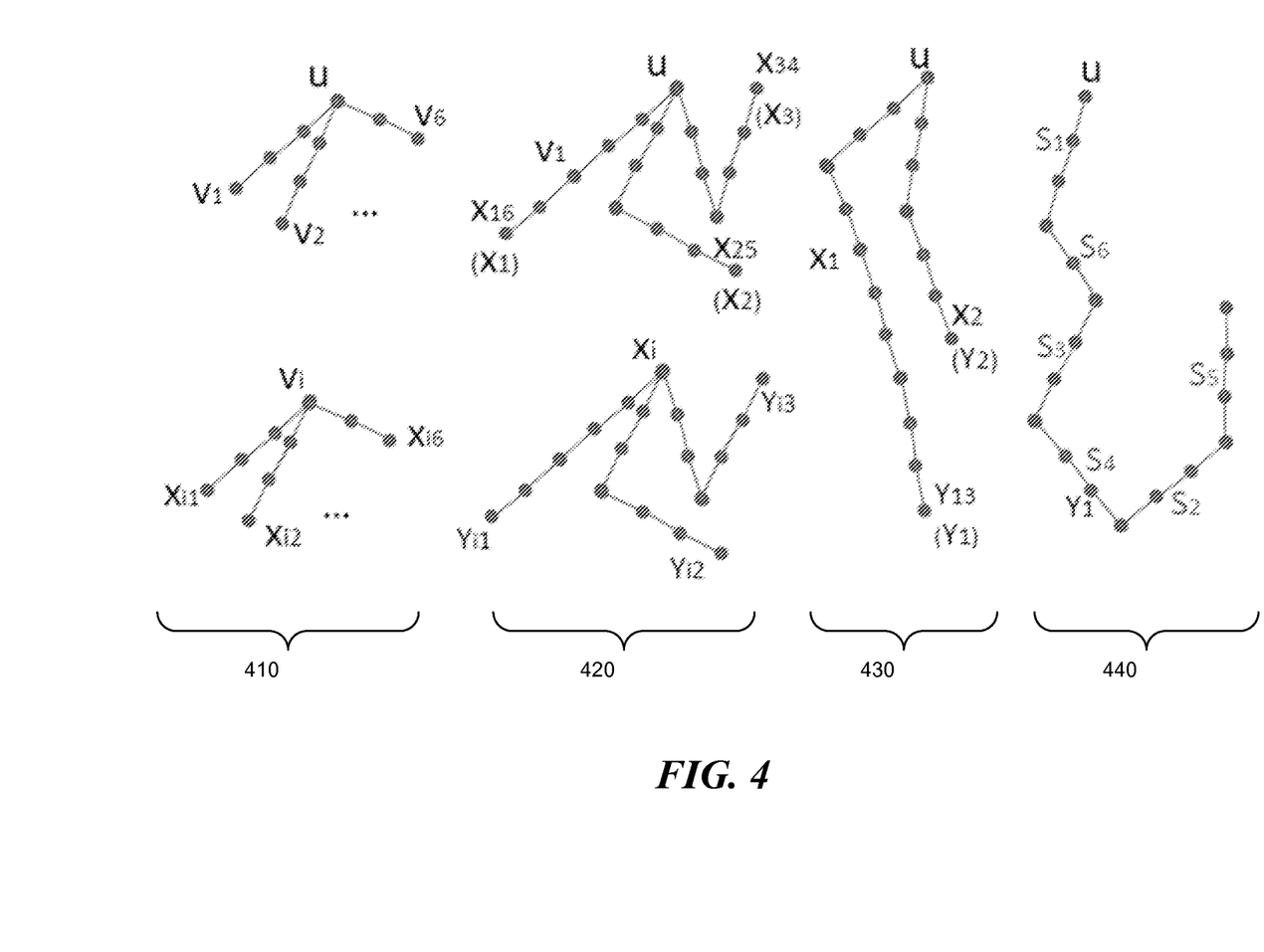
FIG. 4 is a diagram that illustrates segments generated by the doubling function described herein, in one embodiment.

In this example, as shown in FIG. 4, for a node u, W[u,i,6].LastNode=$v_i$, and for each $v_i$, W[$v_i$,j,6].LastNode=$x_{ij}$. Therefore, the method merges W[u,i,6] with W[$v_i$,7−i,6] for i=1,2,3, and gets three new segments: W[u,1,3] that ends at x16 (simplified to x1), W[u,2,3] that ends at x2, and W[u,3,3] that ends at x3, as shown in FIG. 4. Note that merging is done in parallel for all nodes. Therefore, at each $x_i$, there are also three merged segments ending at $y_{ij}$.

Now η=3, and the method will merge W[u,1,3] with W[x1,3,3]. Since η is an odd number, W[u,2,3] does not have a matching segment to merge, and the method will keep W[u,2,3] as the same. The merging results are shown in FIG. 4. For the node u, we now have two segments, W[u,1,2] that ends at y1 and W[u,2,2] that ends at y2 (originally x2). In the final step, the method merges W[u,1,2] with W[y1,2,2], to get W[u,1,1], which has length λ=17.

Notice that if the method denotes a generic initial segment S[u,i] as S[i], by only referring to its ID, we have W[u,1,1]=<S[1],S[6],S[3],S[4],S[2],S[5]> (as shown in FIG. 4). The walk is thus composed of initial segments with different IDs (which are independent, even if starting at the same node), and is hence a true random walk of length 17. Also, notice how the method outputs a random walk of length 17 in just 6 iterations (i.e., 3 iterations for GenSeg, and then 3 more iterations for Doubling merges). Note that SQRT would need at least eight iterations (e.g., with θ=4, 5, or 6) to do the same thing.

Fully Personalized Page Ranks

This section presents the method used by the personalized page rank computation system to fully solve the FPPR MapReduce problem using the previously described methods. It has previously been proposed that to approximate PPRs for a source node u, one can simulate R PPR fingerprints (with geometrically distributed lengths) starting at u, and then use the empirical distribution of the performed walk as the PPR estimation. To approximate FPPR, one can do the same thing for every source node. We note two simple points: (1) the lengths of the fingerprints can be the same for different source nodes, and (2) the fingerprints at different source nodes do not need to be independent. Based on these two points, we can define the following function DoublingPPR for FPPR approximation.

---

DoublingPPR(G,L,ϵ)

Input: A (weighted) graph G = (V,E), (expected) total PPR walk length L, teleport probability ϵ.

Output: Monte Carlo approximation $\hat{\pi}_u(.)$ of the personalized page rank vector of any u ∈ V, obtained by doing PPR walks of (expected) length L.

Let R = ϵL, and for 1 ≤ i ≤ R, let $\lambda_i$ ~ Geom(ϵ) be a random number generated from the geometric distribution Geom(ϵ).

Let $\vec{\theta}$ = ChooseTheta(G,$\vec{\lambda}$), where $\vec{\theta}$ = $\theta_1, \ldots, \theta_R$] and $\vec{\lambda}$ = $\lambda_1, \ldots, \lambda_R$].

For 1 ≤ i ≤ R, let $W_i$ = Doubling(G,λi,θi).
For any u,v ∈ V let C(u,v) = 0.
for i = 1 to R do
  for u,v ∈ V do
    C(u, v)+ = number of visits to v in $W_i$[u]
  end for
end for
for u,v ∈ V do $$\hat{\pi}_u(v) = \frac{C(u, v)}{\sum_{i=1}^{R} \lambda_i}$$

end for
Return $\hat{\pi}_u(.)$ for all u ∈ V.

---

The DoublingPPR function is based on the Doubling method for performing single random walks. DoublingPPR takes as input a (weighted) graph G, the expected total length of the PPR walk to be performed, and the teleport probability ϵ. Then, DoublingPPR generates R=ϵL random numbers $\lambda_i$ from the distribution Geom(ϵ). DoublingPPR then generates the set of parameters $\theta_i$(1≤i≤R) using a call to the function ChooseTheta discussed below. Then, the function uses Doubling(G,$\lambda_i,\theta_i$) (∀1≤i≤R) to generate a walk, $W_i$[u], of length $\lambda_i$, starting at each node u in the graph. Finally, DoublingPPR finds the aggregate count of the number of visits, C(u,v), to each node v in the R walks of source node u, and returns the visiting frequencies as PPR estimations. Note that in the pseudocode listed, for the sake of simplicity of presentation, we are making R separate calls to the Doubling algorithm. However, each of these calls will first access the graph a few times to generate its initial segments, and one can share these graph accesses between all the different calls to Doubling. In other words, with a single access to the graph, we can extend all the unfinished initial segments (by one edge) to saves some data I/O.

One can analyze this implementation to obtain the following expression for its I/O cost:

$$O\left(m \max_{1 \leq i \leq R}\{\theta i\} + n \sum_{i=1}^{R}\left(\lambda_i\theta_i + \lambda_i\log_2\frac{\lambda_i}{\theta_i}\right)\right)$$

This also provides a way for choosing the values of the parameters $\theta_i$ (1≤i≤R). We note that values for $\theta_i$ should be in general chosen to be small numbers, and that the performance of the method is robust to small changes to these parameters. However, a heuristic that one can use is to choose the values of $\theta_i$ to minimize the I/O cost. Thus, one can use this heuristic to implement the function ChooseTheta. The I/O efficiency of DoublingPPR is more efficient than the simple implementation of the Monte Carlo approach proposed.

System Components and Operation

Figure 1:
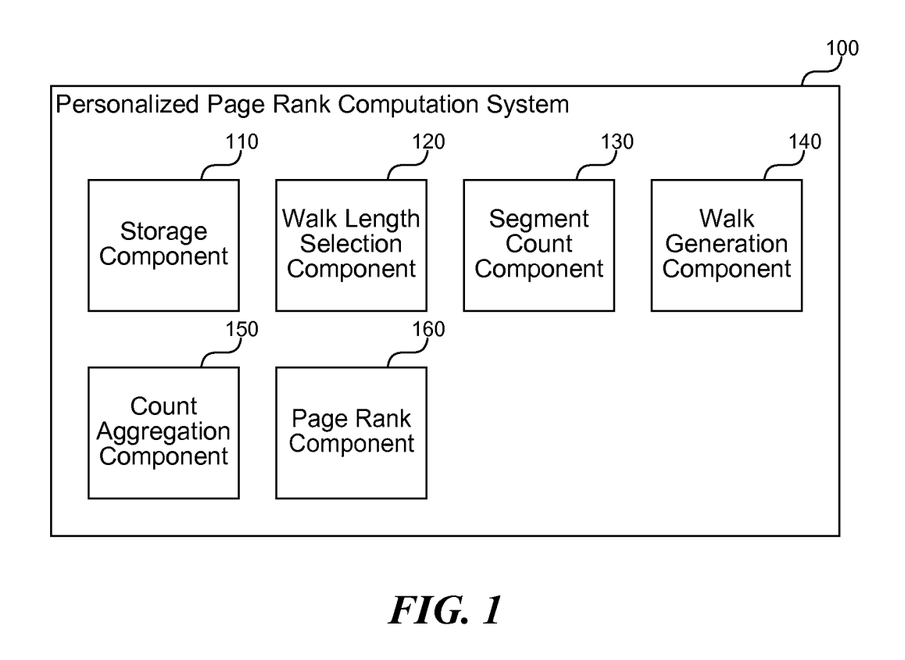
FIG. 1 is a block diagram that illustrates components of the personalized page rank computation system, in one embodiment.

FIG. 1 is a block diagram that illustrates components of the personalized page rank computation system, in one embodiment. The system 100 includes a storage component 110, a walk length selection component 120, a segment count component 130, a walk generation component 140, a count aggregation component 150, and a page rank component 160. Each of these components is described in further detail herein.

The storage component 110 stores intermediate and final results generated by the system while computing personalized page ranks. The storage component 110 may include one or more files, file systems, hard drives, databases, storage area networks, cloud-based storage services, or other facilities for persistently or temporarily storing data. The storage component 110 may include many separate storage facilities, and as is typical with Map Reduce style solutions the storage is designed so that each separate iteration can have its own separate storage without interdependencies between iterations. At the conclusion of the computation, the system 100 merges or gathers information from multiple storage locations to produce a stored final result, which may also be distributed depending on the next step or purpose for the data.

The walk length selection component 120 selects one or more values of walk length to produce a random dataset from which to determine a personalized page rank. The walk length, referred to as λ herein, is randomized to select multiple values to create a sample of walk lengths from which to perform Monte Carlo style simulation. Monte Carlo simulation benefits from a high number of inputs that are truly random to arrive at a numeric approximation for a particular result. In the case of personalized page ranks, varying the walk length provides the system with a more realistic set of potential random walks from which to approximate page rank values. Accordingly, the walk length selection component 120 produces multiple values of the walk length that feed subsequent iterations of the Doubling function and generate personalized page rank values.

The segment count component 130 selects one or more values for a segment count that determines how many segments the system will produce to combine into each random walk. The segment count, referred to as θ herein, determines how long each segment will be, where each segment is the walk length divided by the segment count. The system 100 generates segments and merges segments until each random walk is of the desired walk length using a Map Reduce style function described herein. The segment count component 130 may select the segment count in a manner that reduces I/O cost of the system 100.

The walk generation component 140 generates random walks for each selected value of the walk length and segment count. A random walk represents a path that a user might take from a particular web page, a path through the users friends (or potential friends in the case of suggestions), and other applications where personalized page ranks can be used. The walk generation component 140 produces random walks using the Doubling function described herein, where each iteration produces multiple potential segments for a complete walk, and at least one iteration merges segments to produce the complete walk of the selected length. The walk generation component 140 may invoke one or more Reducer and Combiner primitives as described herein to divide the problem for Map Reduce style parallel processing.

The count aggregation component 150 aggregates multiple counts that describe how many times each node in a graph was visited based on the generated random walks. The counts, when aggregated, allow for a Monte Carlo solution by aggregating the results of many random input values to observe the resulting output values. The output values approximate a correct personalized page rank for each node in the graph. The count aggregation component 150 may produce weights or other numerical output, stored in the storage component 110, that can act as input to a subsequent use for the data, such as a search engine, social networking engine, and so forth.

The page rank component 160 determines a fully personalized page rank for each node in the graph based on the aggregated counts from each random walk. The personalized page rank indicates a likelihood of traveling down a particular path from each node based on the accumulated visits found by the random walks. The page rank component 160 outputs the results of the full Map Reduce computation, and may store the results in the storage component 110 or output the results to another system component (not shown), such as through a programmatic application-programming interface (API). Another system or component of the same system 100 can then pick up the result and perform any subsequent processing based on the particular desired use of the data in any particular implementation.

The computing device on which the personalized page rank computation system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
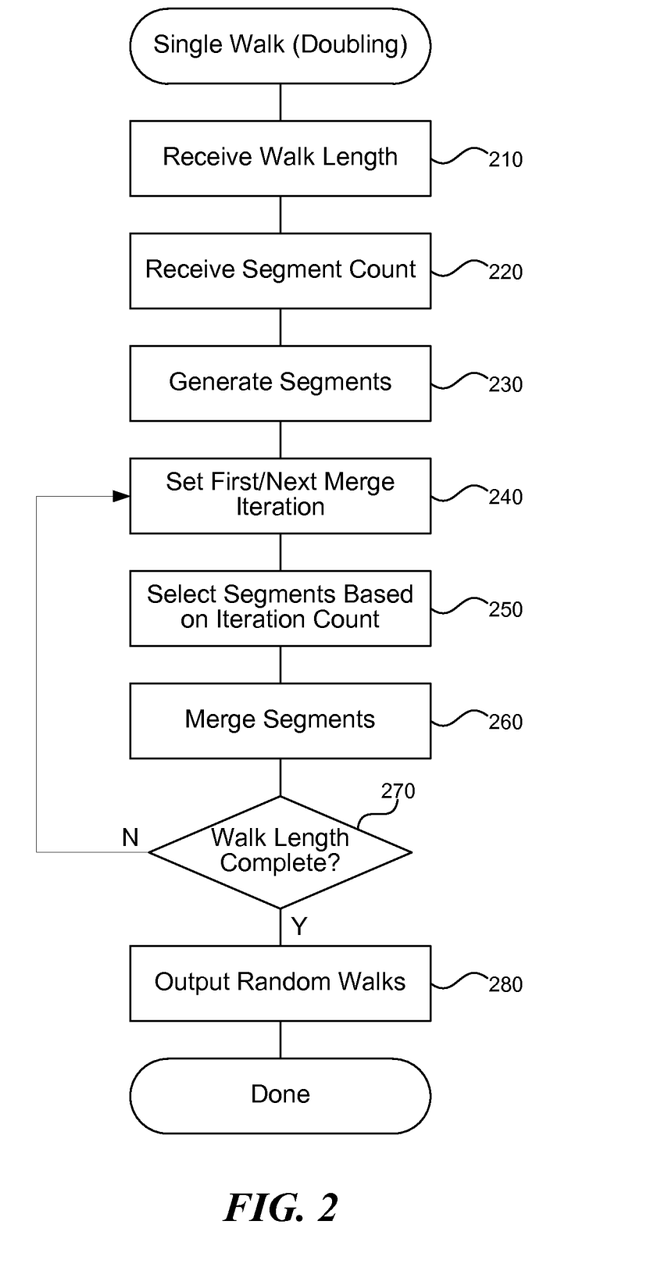
FIG. 2 is a flow diagram that illustrates processing of the personalized page rank computation system to generate a single random walk from a source node, in one embodiment.

FIG. 2 is a flow diagram that illustrates processing of the personalized page rank computation system to generate a single random walk from a source node, in one embodiment. Beginning in block 210, the system receives an input walk length that specifies a number of nodes to be visited from a source node to produce a random walk from each source node in an input graph. The user of the system will set the walk length depending on the particular problem being solved. In the case of personalized page rank, the process described in FIG. 3 will invoke the process of FIG. 2 with multiple different walk lengths to generate walks of several lengths that produce a suitable set of input for Monte Carlo approximation of page rank at each node.

Continuing in block 220, the system receives an input segment count that determines how long each segment generated by a first iteration of the method will be. The segment length can be determined by dividing the received walk length by the segment count (and rounding or truncating to produce a whole number). The system may perform multiple iterations, and the first iteration generates segments of the determined segment length, which are then merged with other segments in subsequent iterations to produce successively exponentially longer segments until the requested walk length is achieved. The segment count may be set in a manner that reduces I/O cost of performing the method or in any other manner determined for a particular use of the system. In the case of personalized page rank, the process of FIG. 3 will select several different segment count values with which to invoke the process of FIG. 2 to produce an appropriate distribution for Monte Carlo approximation.

Continuing in block 230, the system generates segments of the determined segment length based on the received walk length and segment count. The system uses Map Reduce style parallel processing to generate many independent segments for the nodes in the graph at the same time. The segments make up portions of the complete random walk for each node, and are merged together in the following steps. The segments may be generated using a number of random walk algorithms that select a random neighbor at each node to form the next node in the walk for a particular segment. This corresponds to the RandomNeighbor function described earlier herein.

Continuing in block 240, the system modifies an iteration count based on a current iteration of merging generated segments. Initially the iteration count is set to an initial value (e.g., one) to indicate the first iteration. On subsequent iterations, the iteration count may be modified based on a particular manner of distributing segment combinations. In some embodiments, the system determines a value η based on the received walk length and segment count, and geometrically modifies the value on each iteration to produce a geometrically decreasing number of iterations. Because the system efficiently merges longer segments with each iteration (of length θ on the first iteration, then 2θ, then 4θ, and so on), the total number of iterations is reduced from a purely linear approach.

Continuing in block 250, the system selects segments to merge based on the modified iteration count. In some embodiments, the system counts up when selecting a source segment to merge and counts down when selecting a target segment to merge. For example, if a node u has six segments $u_1$ to $u_6$, and a node v has segments $v_1$ to $v_6$, then the system may choose to merge the first segment of u (aka $u_1$) with the last segment of v (aka $v_6$). The first merge produces segments of length 2θ that the system will merge in the next iteration to produce segments of length 4θ, until the received walk length is achieved. This type of merging is particular well suited to Map Reduce parallel processing, which can combine the segments in a distributed fashion.

Continuing in block 260, the system merges the selected segments to produce longer segments for merging in the next iteration. The merged segments get exponentially longer until the received walk length is achieved for a walk from each node in the graph. Merging may include setting an identifier for the new merged segment to the lower of two identifiers found on each of the segments that were merged together. Because the value η described previously gets progressively smaller, keeping the lower identifier is appropriate for the next iteration.

Continuing in decision block 270, if the system determines that the walk is done because the segments have reached the length of the received walk length, then the system continues at block 280, else the system loops to block 240 to perform the next iteration. The number of iterations performed is based on the received walk length and segment count, but is made much smaller than any previous system for particular values of the walk length and segment count by performing work more efficiently to get more done at each iteration as described herein.

Continuing in block 280, the system outputs the determined walks for each node in the graph. The output may include storing the walk information in a data store, invoking other components to process the output data, displaying information to an interactive user interface, and so forth. The walks from each node represent a random path of the specified length. After block 280, these steps conclude.

Figure 3:
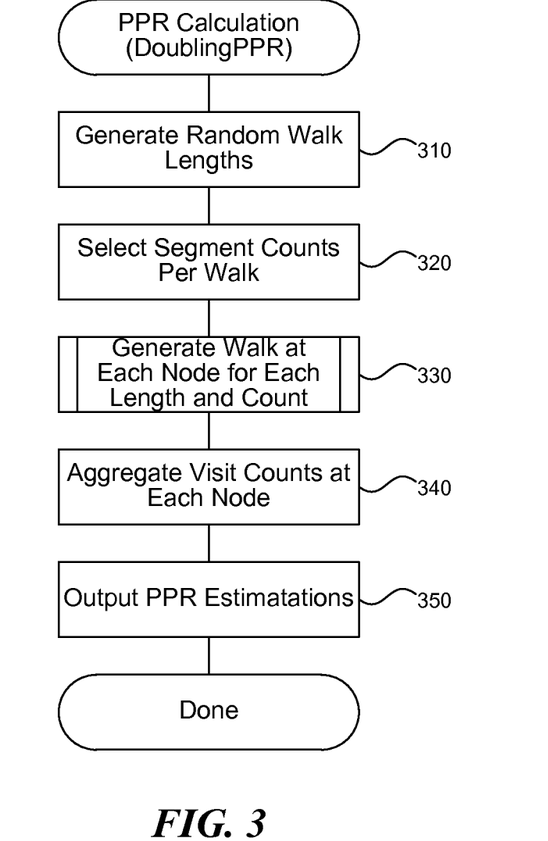
FIG. 3 is a flow diagram that illustrates processing of the personalized page rank computation system to determine a fully personalized page rank from each node in a source graph, in one embodiment.

FIG. 3 is a flow diagram that illustrates processing of the personalized page rank computation system to determine a fully personalized page rank from each node in a source graph, in one embodiment.

Beginning in block 310, the system generates multiple walk lengths for which to calculate random walks from each node in the source graph. The system may generate the walk lengths based on a teleport probability ε and a total PPR walk length L as described further herein. The walk lengths can be determined as a geometric distribution over the teleport probability. By choosing multiple walk lengths, the system increases the random sample that provides input for Monte Carlo style simulation and analysis. The more and longer random walks the system provides, the more accurate the approximation will generally be.

Continuing in block 320, the system selects one or more segment counts per generated walk length. In most cases, the segment count is selected to reduce I/O or other computation costs of computing the walks. By selecting a particular value of the segment length, the system can optimize the cost of the computation. The system may also allow the user to provide a user-defined function for selecting segment counts based on a particular implementation or purpose for the output that may make different segment length values more suitable or accurate.

Continuing in block 330, the system generates a random walk for each node of the graph using each generated value for the walk length and segment counts. For example, the system may invoke the function described with reference to FIG. 2 to produce a random walk for a particular value of walk length and segment count. The system does this for the total determined number of walks to be performed, until each generated walk length and segment count has been used to compute random walks for the graph.

Continuing in block 340, the system aggregates visit counts for each node in the graph based on the generated random walks. The nodes visited will provide a Monte Carlo style approximation of the page rank for each node. By aggregating all of the counts, the system increases the number of inputs and thus improves the results of the approximation.

Continuing in block 350, the system outputs one or more personalized page rank estimations for the source graph. The output may be stored to disk or another data store, transmitted to other components or systems for subsequent analysis, or displayed depending on the particular implementation or purpose for the information. After block 350, these steps conclude.

FIG. 4 is a diagram that illustrates segments generated by the doubling function described herein, in one embodiment. In a first iteration 410, the system generates segments from two nodes u and $v_t$ that have a length of three, except for the final segment, which has a length of two. In this case, the selected values were 17 for the walk length and 6 for the segment count, leading to a general segment length of three, except for the last segment. In the next iteration 420, the system merges the segments in a manner that counts forwards for a first segment and backwards for a second segment. For example, the segment from u labeled $v_1$ is merged with the segment from $v_t$ labeled $x_{t6}$ to produce the segment labeled $x_1$ in the second iteration 420. The segments resulting from the second iteration 420 are merged again in the third iteration 430 to produce progressively longer segments (length=3 in the first iteration 410, length=6 in the second iteration 420, and length=12 in the third iteration). The merging occurs again, so that by the fourth iteration 440, the system has produced walks that are both random and of the requested walk length. The system accomplishes this be distributing each iteration for parallel processing by a potentially large number of computer systems, so that even very large graphs can be processed quickly. By reducing the number of iterations and increasing the work accomplished in each iteration, the system can effectively leverage available computing resources and makes feasible computations that involve very large graphs.

In some embodiments, the personalized page rank computation system selects a segment count based on various tradeoffs. As indicated herein, a higher segment count value (λ) will lead to more steps in the segment generation phase but fewer steps in the segment merging phase. A smaller segment count value will lead to a larger set of segments to manage and may increase I/O cost. Depending on the type of data and computing resources involved in the calculation, one phase may be more limiting for a particular problem set than another may. Thus, the system may select a segment count that is most appropriate for a particular problem set or computing environment.

In some embodiments, the personalized page rank computation system shares generated segments across multiple walks when determining personalized page ranks. Segments generated for a particular walk may be reused in some cases for other walks. This may make the system more efficient but may also decrease the entropy of the distribution. The distribution will still be random, but may explore less ground than separately generated segments. However, for some implementations this may be an acceptable tradeoff that produces a useful performance increase. For example, if a system has calculated a walk of length three, then the system can compute a walk of length four by adding one more segment. Likewise, if the system has computed segments of a particular length, then the system can compute longer segments by appending additional nodes to the existing segments.

From the foregoing, it will be appreciated that specific embodiments of the personalized page rank computation system have been described herein for purposes of illustration, but that various modifications may be made without deviating from the spirit and scope of the invention. Accordingly, the invention is not limited except as by the appended claims.

We claim:

1. A computer-implemented method to generate random walks from source nodes in a graph, the method comprising:
   receiving an input graph;
   receiving an input walk length that specifies a number of nodes to be visited from a source node to produce a random walk from each source node in an input graph;
   receiving an input segment length that determines how long each segment generated by the method will be;
   determining a number of segments of the received input segment length to be generated out of each node of the input graph based on the received input walk length;
   generating the determined number of segments of the received segment length; and
   merging the generated segments iteratively, merging multiple segments per node in each iteration, until a random walk of the received input walk length is obtained from each node,
   wherein at least a portion of the preceding steps are performed by at least one processor.

2. The method of claim 1 wherein determining the number of segments comprises dividing the received walk length by the received segment length.

3. The method of claim 1 wherein generating segments comprises using Map Reduce style parallel processing to generate multiple independent segments for the nodes in the graph in parallel.

4. The method of claim 3 wherein generating multiple independent segments in parallel comprises computing multiple segments of length one for the nodes in parallel where each length-one segment for a node is a random neighbor for that node.

5. The method of claim 4 wherein generating multiple segments of length one for the nodes in parallel comprises grouping outgoing edges for each node in parallel via a Map phase, and picking random neighbors from the group in parallel via a Reduce step.

6. The method of claim 3 wherein generating multiple segments of an input desired length for the nodes in parallel comprises running a plurality of iterations of a combiner where each iteration extends all segments of all nodes in parallel by one edge and terminating when the segments reach the input desired length.

7. The method of claim 1 wherein merging segments comprises merging multiple segments per node in each iteration and maintaining multiple intermediate walks per node.

8. The method of claim 1 wherein merging segments comprises merging pairs of segments generated by the segment generation step to produce walks of twice the segment length in the first iteration, then merging pairs of intermediate walks generated by the first iteration to produce walks of four times the segment length in the second iteration.

9. The method of claim 1 wherein merging segments comprises selecting segments to merge using identifiers of each segment, a maximum identifier of the segments for each node, and a current iteration number.

10. The method of claim 1 wherein merging segments comprises selecting intermediate walks to merge using an id logic ensures that a segment is never used twice in constructing a single random walk.

11. The method of claim 1 wherein merging segments (in a first iteration) and intermediate walks (in subsequent iterations) in each iteration is performed in parallel using Map Reduce style parallel processing.

12. The method of claim 1 wherein merging segments comprises merging selected intermediate walks by creating intermediate walks that are exponentially longer at each iteration until the received walk length is achieved for a walk from each node in the graph.

13. A computer-readable storage device comprising instructions for controlling a computer system to compute personalized page rank vectors of nodes of a given graph, wherein the instructions, upon execution, cause a processor to perform actions comprising:
   receiving an input graph;
   receiving an input teleport probability;
   generating random numbers from a geometric distribution;
   generating random walks starting at each node of the graph using the geometrically distributed random numbers as walk lengths passed to a doubling function that uses Map Reduce style parallel processing;
   aggregating visit counts for each node in the graph based on the generated random walks; and
   outputting one or more personalized page rank estimations based on the aggregated visit counts for the source graph.

14. The device of claim 13 wherein generating random walks comprises selecting a segment length that minimizes input/output (I/O) cost.

15. The device of claim 13 wherein access to the input graph is shared between multiple parallel calls to the doubling function.

16. The device of claim 13 wherein the doubling function computes random walks in parallel using Map Reduce style parallel processing.

17. A computer system for performing fast personalized page rank using distributed parallel processing, the system comprising:
   a processor and memory configured to execute software instructions embodied within the following components;
   a storage component that stores intermediate and final results generated by the system while computing personalized page ranks;
   a walk length selection component that selects one or more values of walk length to produce a random dataset from which to determine a personalized page rank;

a segment count component that selects one or more values for a segment count that determines how many segments the system will produce to combine into each random walk;

a walk generation component that generates random walks for each selected value of the walk length and segment count, invoking one or more Reducer and Combiner primitives, with a random walk representing a random path between nodes of the graph;

a count aggregation component that aggregates multiple counts that describe how many times each node in a graph was visited based on the generated random walks; and a page rank component that determines a fully personalized page rank for each node in the graph based on the aggregated counts from each random walk.

18. The system of claim 17 wherein the walk length selection component randomizes the walk length to select multiple values to create a sample of walk lengths from which to perform Monte Carlo style approximation to solve a personalized page rank problem.

19. The system of claim 17 wherein the walk generation component invokes the one or more Reducer and Combiner primitives to divide the walk generation for Map Reduce style parallel processing.

20. The system of claim 17 wherein the walk length component selects a segment length that minimizes input/output (I/O) cost associated with operation of the system.

* * * * *